United States Patent
Goseberg et al.

(10) Patent No.: US 10,525,883 B2
(45) Date of Patent: Jan. 7, 2020

(54) VEHICLE VISION SYSTEM WITH PANORAMIC VIEW

(71) Applicant: MAGNA ELECTRONICS INC., Auburn Hills, MI (US)

(72) Inventors: Frank Goseberg, Aschaffenburg (DE); Ruediger Boegel, Grossostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 768 days.

(21) Appl. No.: 14/852,950

(22) Filed: Sep. 14, 2015

(65) Prior Publication Data

US 2016/0044284 A1    Feb. 11, 2016

Related U.S. Application Data

(60) Provisional application No. 62/012,040, filed on Jun. 13, 2014, provisional application No. 62/057,272, (Continued)

(51) Int. Cl.
*H04N 7/18*    (2006.01)
*G06F 3/01*    (2006.01)
(Continued)

(52) U.S. Cl.
CPC ............... *B60R 1/00* (2013.01); *G06F 3/012* (2013.01); *G06F 3/013* (2013.01); *H04N 5/23238* (2013.01); *B60R 2300/303* (2013.01)

(58) Field of Classification Search
CPC ............... B60R 1/00; B60R 2300/303; B60R 2300/307; G06F 3/012; G06F 3/013; H04N 5/23238
(Continued)

(56) References Cited

U.S. PATENT DOCUMENTS

| | | | |
|---|---|---|---|
| 5,550,677 A | 8/1996 | Schofield et al. | |
| 5,646,614 A * | 7/1997 | Abersfelder | B60Q 9/005 340/435 |

(Continued)

FOREIGN PATENT DOCUMENTS

| | | |
|---|---|---|
| WO | WO2011/155878 | 12/2011 |
| WO | WO2012/103193 | 8/2012 |

(Continued)

OTHER PUBLICATIONS

Hicks et al., "Panoramic Electronic Rear Vision for Automotive Applications", SAE Technical Paper Series, International Congress and Exposition, Detroit, MI, Mar. 1-4, 1999.

*Primary Examiner* — Sath V Perungavoor
*Assistant Examiner* — Yong Joon Kwon
(74) *Attorney, Agent, or Firm* — Honigman LLP

(57) ABSTRACT

A vision system for a vehicle includes side and rear cameras that are operable to capture image data. The rear camera is configured to be disposed at a rear portion of the vehicle so as to have a rearward field of view and the side cameras are configured to be disposed at respective side portions of the vehicle so as to have respective sideward and rearward fields of view. The rear camera has a rear imager and a wide angle lens, which is disposed at the rear imager with its center axis offset from a center region of the rear imager so as to be disposed at and to image at an upper region of the rear imager. An image processor processes captured image data to merge captured image data to provide a panoramic image for display to the driver during a reversing maneuver of the vehicle.

20 Claims, 15 Drawing Sheets

Related U.S. Application Data filed on Sep. 30, 2014, provisional application No. 62/050,420, filed on Sep. 15, 2014.

(51) Int. Cl.
*B60R 1/00* (2006.01)
*H04N 5/232* (2006.01)

(58) Field of Classification Search
USPC .......................................................... 348/148
See application file for complete search history.

(56) References Cited

U.S. PATENT DOCUMENTS

| | | | |
|---|---|---|---|
| 5,670,935 | A | 9/1997 | Schofield et al. |
| 5,949,331 | A | 9/1999 | Schofield et al. |
| 6,396,397 | B1 | 5/2002 | Bos |
| 6,424,272 | B1 | 6/2002 | Gutta et al. |
| 6,509,832 | B1 | 1/2003 | Bauer |
| 6,717,610 | B1 | 4/2004 | Bos et al. |
| 7,005,974 | B2 | 2/2006 | McMahon et al. |
| 7,914,187 | B2 | 3/2011 | Higgins-Luthman et al. |
| 8,421,865 | B2 | 4/2013 | Euler et al. |
| 8,462,209 | B2 * | 6/2013 | Sun ..................... G01C 11/025 348/144 |
| 8,477,191 | B2 * | 7/2013 | Ito ......................... H04N 7/181 348/118 |
| 8,798,451 | B1 | 8/2014 | Kweon |
| 9,085,261 | B2 | 7/2015 | Lu et al. |
| 9,146,898 | B2 | 9/2015 | Ihlenburg et al. |
| 9,150,155 | B2 | 10/2015 | Vico et al. |
| 9,280,202 | B2 | 3/2016 | Gieseke et al. |
| 2002/0167589 | A1* | 11/2002 | Schofield ............... B60N 2/002 348/148 |
| 2004/0008407 | A1 | 1/2004 | Wallerstein et al. |
| 2008/0239527 | A1* | 10/2008 | Okabe .................... B60Q 9/008 359/843 |
| 2009/0005961 | A1 | 1/2009 | Grabowski |
| 2009/0243824 | A1* | 10/2009 | Peterson .................. B60R 1/12 340/435 |
| 2010/0020170 | A1 | 1/2010 | Higgins-Luthman |
| 2010/0220189 | A1* | 9/2010 | Yanagi .................... B60R 1/00 348/148 |
| 2010/0265048 | A1 | 10/2010 | Lu et al. |
| 2010/0328499 | A1 | 12/2010 | Sun |
| 2011/0032374 | A1* | 2/2011 | Imanishi .................. B60R 1/00 348/222.1 |
| 2011/0069148 | A1* | 3/2011 | Jones ..................... H04N 5/232 348/36 |
| 2011/0291918 | A1 | 12/2011 | Surber et al. |
| 2012/0169875 | A1* | 7/2012 | Matsukawa ............... B60R 1/00 348/148 |
| 2012/0242882 | A1 | 9/2012 | Sutton |
| 2012/0257060 | A1 | 10/2012 | Bos et al. |
| 2012/0265416 | A1 | 10/2012 | Lu et al. |
| 2013/0046441 | A1* | 2/2013 | Marczok ................ B60Q 9/005 701/41 |
| 2013/0222592 | A1 | 8/2013 | Gieseke et al. |
| 2014/0067206 | A1 | 3/2014 | Pflug |
| 2014/0085472 | A1 | 3/2014 | Lu et al. |
| 2014/0160276 | A1 | 6/2014 | Pliefke et al. |
| 2014/0168415 | A1 | 6/2014 | Ihlenburg et al. |
| 2014/0247352 | A1 | 9/2014 | Rathi et al. |
| 2014/0309884 | A1 | 10/2014 | Wolf |
| 2014/0336876 | A1 | 11/2014 | Gieseke et al. |
| 2014/0362209 | A1 | 12/2014 | Ziegenspeck et al. |
| 2014/0368654 | A1 | 12/2014 | Wierich |
| 2015/0002670 | A1 | 1/2015 | Bajpai |
| 2015/0009010 | A1 | 1/2015 | Biemer |
| 2015/0015710 | A1 | 1/2015 | Tiryaki |
| 2015/0222664 | A1 | 1/2015 | Pflug et al. |
| 2015/0042808 | A1 | 2/2015 | Pflug |
| 2015/0217693 | A1 | 8/2015 | Pflieke et al. |
| 2015/0222798 | A1 | 8/2015 | Sauer et al. |
| 2015/0232030 | A1 | 8/2015 | Bongwald et al. |
| 2015/0294169 | A1 | 10/2015 | Zhou |
| 2015/0296135 | A1 | 10/2015 | Wacquant |
| 2016/0137126 | A1 | 5/2016 | Fursich et al. |
| 2016/0209647 | A1 | 7/2016 | Fursich et al. |
| 2017/0124405 | A1 | 5/2017 | Gupta et al. |
| 2017/0232898 | A1* | 8/2017 | Maejima ................. B60R 1/002 348/118 |

FOREIGN PATENT DOCUMENTS

| | | |
|---|---|---|
| WO | WO2012/145501 | 10/2012 |
| WO | WO2012/145822 | 11/2012 |
| WO | WO2012/158167 | 11/2012 |
| WO | WO2013/067082 | 5/2013 |
| WO | WO2013/074604 | 5/2013 |
| WO | WO2013067083 | 5/2013 |
| WO | WO2013/086249 | 6/2013 |
| WO | WO2013/109869 | 7/2013 |

* cited by examiner

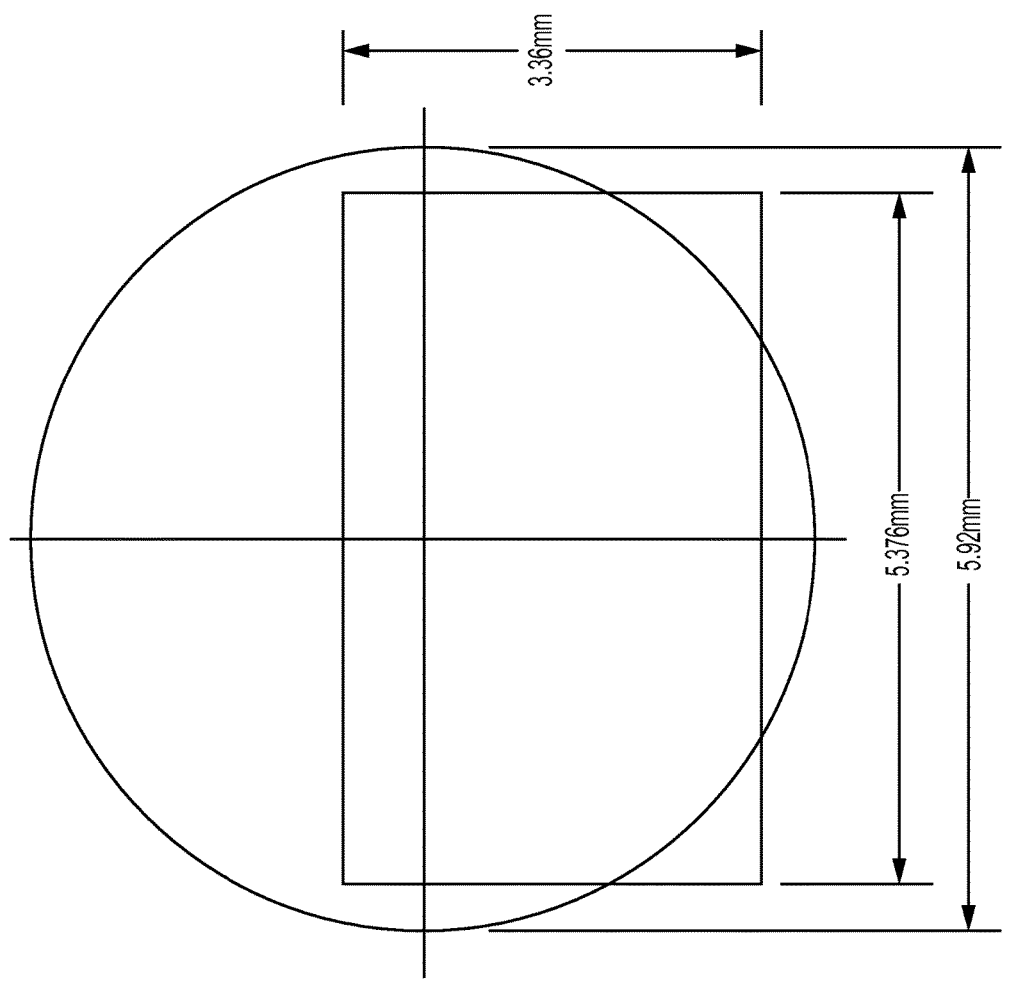

VEHICLE VISION SYSTEM WITH PANORAMIC VIEW

CROSS REFERENCE TO RELATED APPLICATIONS

The present application claims the filing benefits of U.S. provisional applications Ser. No. 62/012,040, filed Jun. 13, 2014, Ser. No. 62/057,272, filed Sep. 30, 2014, and Ser. No. 62/050,420, filed Sep. 15, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle. The vision system includes a plurality of cameras disposed at the vehicle and having respective fields of view exterior of the vehicle. The cameras capture image data. The cameras include a rear camera disposed at a rear portion of the vehicle and having a rearward field of view. The rear camera has an imager and a wide angle lens that is offset relative to the imager so that the field of view of the rear camera includes rear portions of the vehicle. The cameras include side cameras disposed at respective side portions of the vehicle and having respective sideward and rearward fields of view. An image processor is operable to process image data captured by the cameras. The image processor is operable to merge or stitch or blend image data captured by the cameras to provide a panoramic image for display to the driver of the vehicle during a reversing maneuver of the vehicle. Optionally, a graphic overlay is established on the displayed images.

These and other objects, advantages, purposes and features of the present invention will become apparent upon review of the following specification in conjunction with the drawings.

BRIEF DESCRIPTION OF THE DRAWINGS

FIG. 10 is a schematic of a rear camera having a fish eye lens or high distortion lens that is assembled off center of the (rectangle) imager along the short side of the imager in accordance with the present invention;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
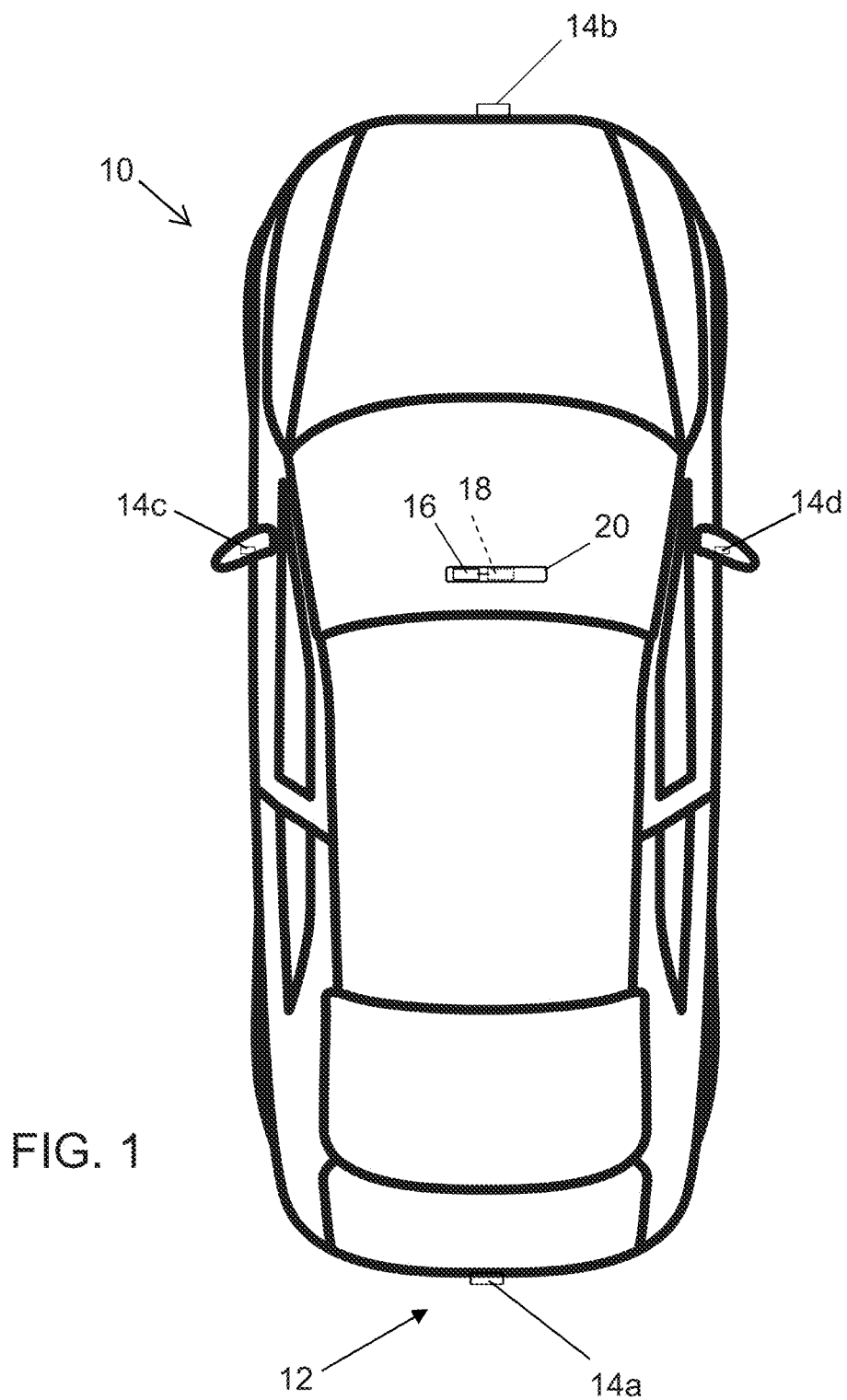
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

An example of a stitched rear view is described in U.S. Publication No. US-2010-0020170, which is hereby incorporated herein by reference in its entirety. In there, fish eye cameras capture and generate images at the sides of the vehicle and at the rear of the vehicle, and the captured images are merged or stitched together to provide a single panoramic view or image.

Figure 2:
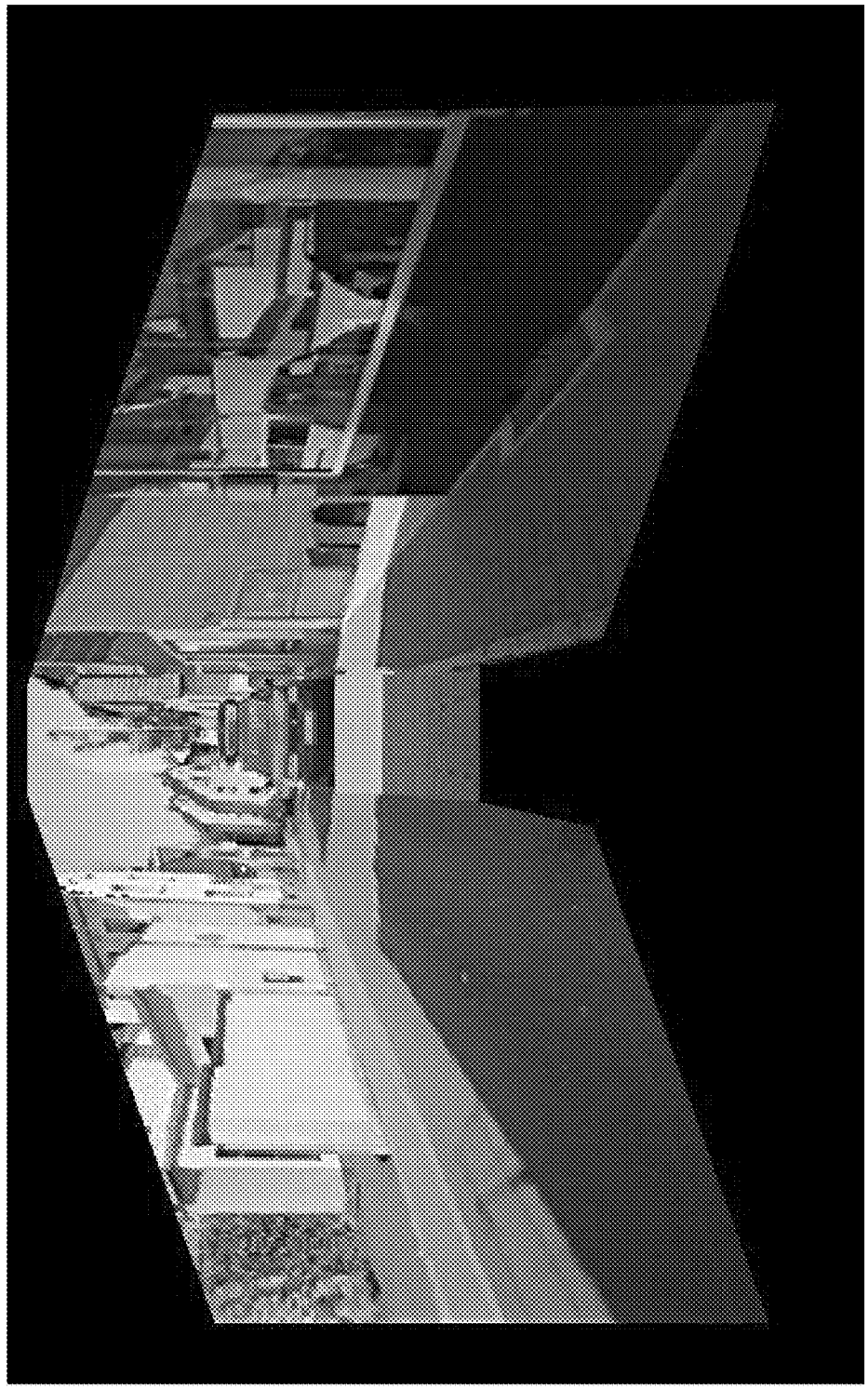
FIG. 2 is a displayed image comprising image portions from three cameras, with the cameras having offset lenses.
Figure 3:
FIG. 3 is an image captured by a rear camera with its imager's long side oriented vertically and the lens shifted upright against the imager, with the left and right rear edge of the vehicle not in the field of view of the rear camera.
Figure 4:
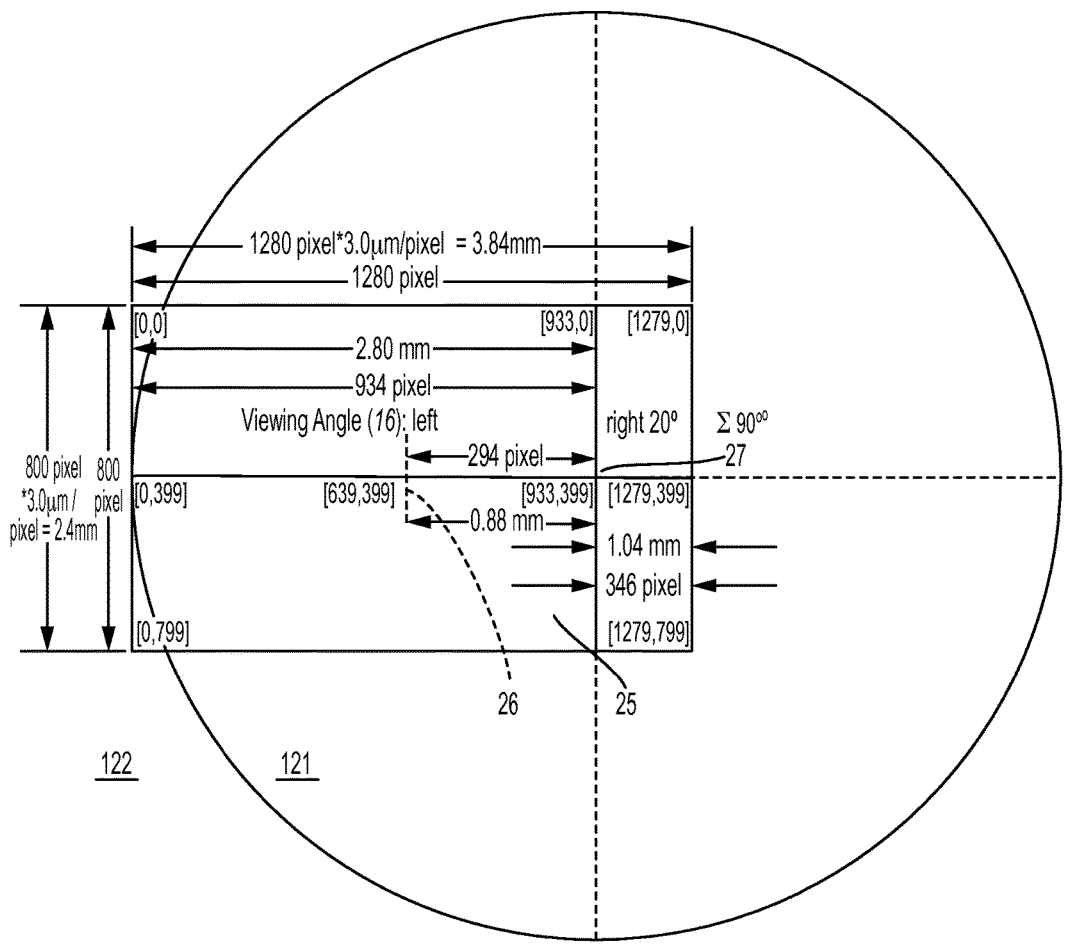
FIG. 4 is a schematic of an imager's sensitive area shifted along the long side against the image circle of a high distortion lens, having a light sensitive area of an imager of a camera 25, with 26 being the center of that imager and 27 being the center of the optical axis of the lens, shown with the full circle of the incoming light projected by the lens system.
Figure 5:
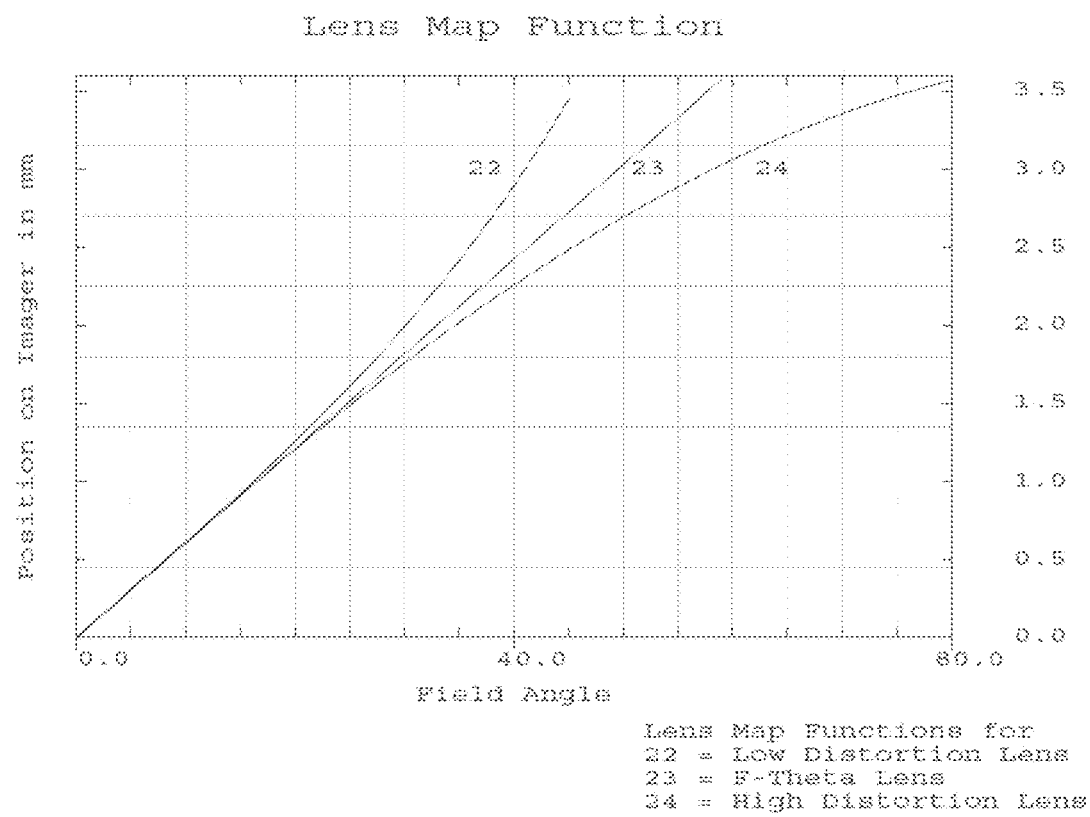
FIG. 5 is a chart showing the distortion behavior of three types of fish eye lenses, with line 22 representing a lower distortion lens with limited viewing angle, line 23 representing a lens with a middle high distortion (f-theta lens), and line 24 representing a higher distortion lens with an increased viewing angle, and with the magnification at the center being similar in all three cases.
Figure 6A:
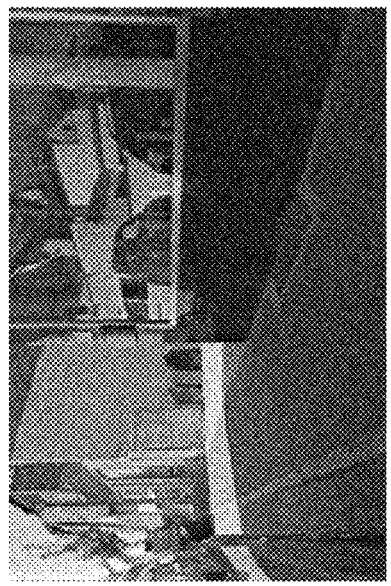
FIGS. 6A-C show the source images from which the panorama rear view image of FIG. 2 was stitched.
Figure 6B:
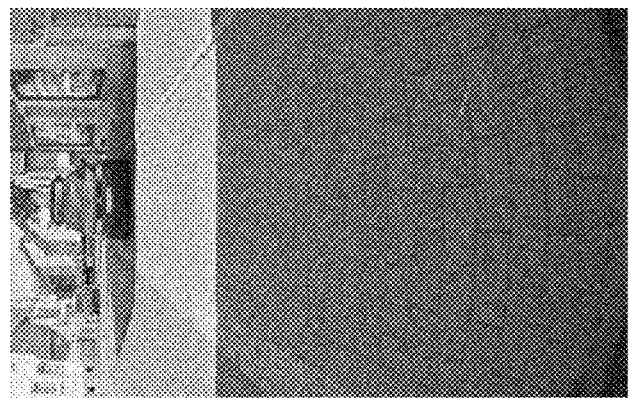
Figure 6C:
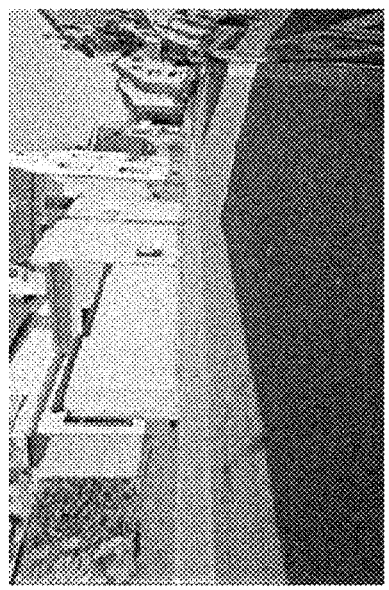

In International Publication No. WO 2014/204794 (which is hereby incorporated herein by reference in its entirety) it is suggested to produce a panorama view (such as shown in FIG. 2) using high distortion lens systems on cameras, with the cameras' imagers assembled off center (relative to the fish eye lens) along the imagers' long side, see the configuration in FIG. 4 and produced image of FIG. 3. A Lens map function of a high distortion lens 24 (above F-Theta) is shown in comparison to a F-Theta lens 23 (linear) and a low distortion lens 22 (below F-Theta) in FIG. 5. When using these cameras as side cameras, the camera may be turned horizontally with the high distortion area outboard (see FIGS. 6A and 6B), and when used as a rear camera, the cameras may be turned vertically with the high distortion area downwardly (see FIG. 6C). In such a configuration, the horizontal rear view area has a relatively good resolution (see FIG. 2). The drawback of such a configuration is that the left and right edge of the vehicle is not in the view of the rear camera any more (see FIGS. 3 and 6C), which is desired for rear camera applications such as rear cross traffic view, in which a view is generated of the rear left and rear right of the subject vehicle.

As can be seen in the specific example in FIG. 4, and such as described in International Publication No. WO 2014/204794, the center axis of the lens may be offset from the central region. In the illustrated example, the center axis of the lens is offset or shifted by about 294 pixels or about 0.88 mm (or about 46 percent) from the center region and towards one side of the imaging array (when mounted as a CMS camera, the shift direction may point away from the vehicle body, and the optical center may always point to the most significant region of interest while the higher distorted area may be used to have at least some sensing pixel covering it). The according pixel positions of the optical center 27 (or center axis of the lens), the imager's center 26 and its corners are shown as pixel coordinates in FIG. 4 (such as, for example, the coordinates [639,399] being at the center of the imager having pixel dimensions 1240×800). As can be seen in FIG. 4, the imager ends on the borderline of the area the optic projects light on 121 (this is an optimized placement, optionally the imager may be more inbound which reduces the high distortion benefit of the area on the far end). In area 122, no direct light (besides maybe stray light) is present. In this example, the lens system may have an overall viewing or opening angle of about 90 degrees.

Figure 7:
FIG. 7 is a displayed image comprising image portions from two side cameras and one rear camera, with all three cameras having fisheye lenses.
Figure 8:
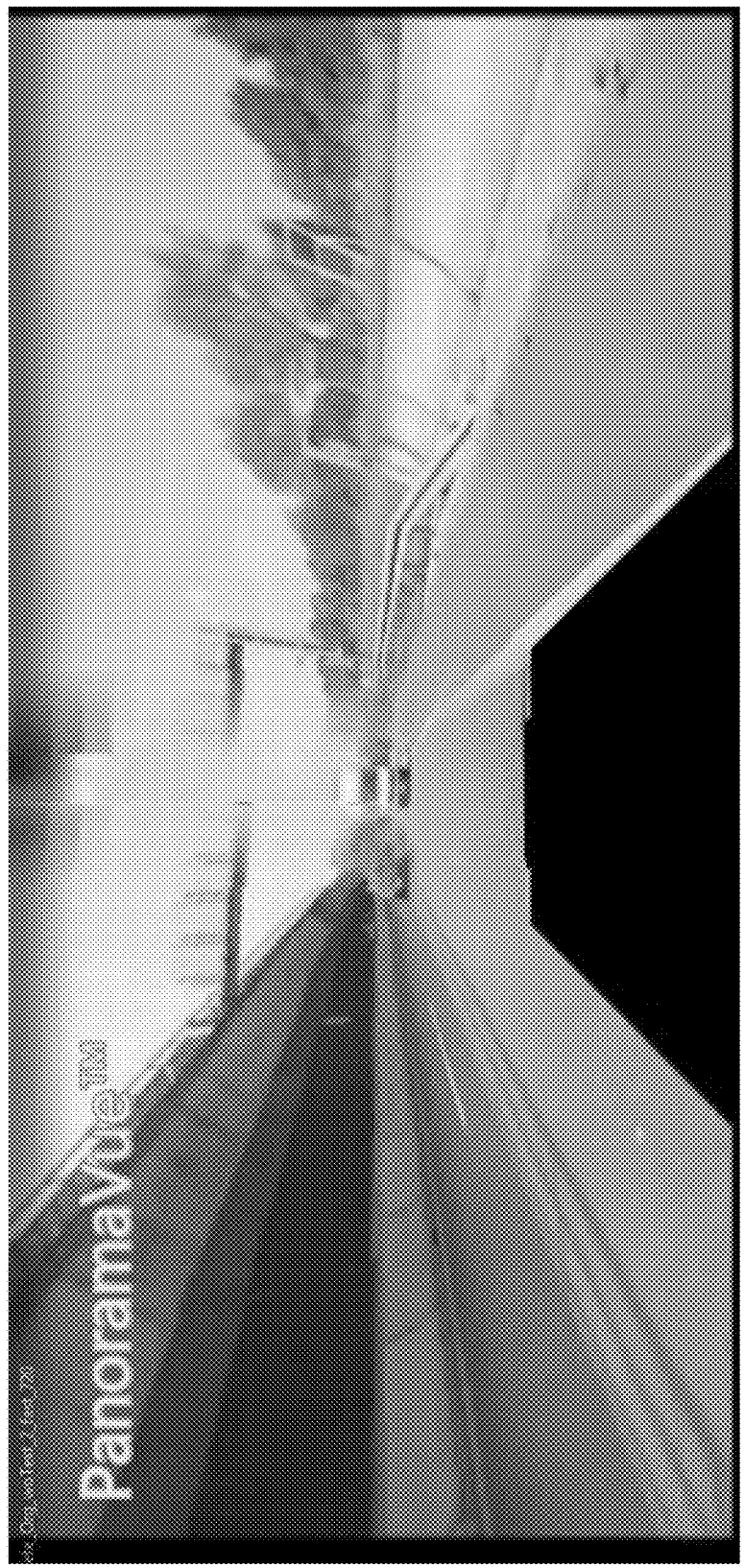
FIG. 8 is a displayed image comprising image portions from two side cameras and one rear camera, with both side cameras having imager long side shifted lenses and the rear camera having a common fisheye lens.
Figure 9A:
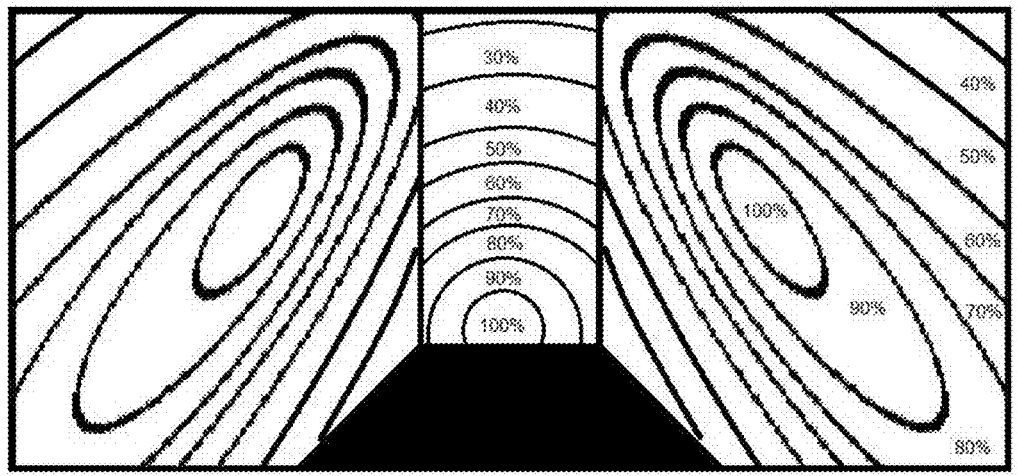
FIG. 9A is a schematic showing resolution of a rear camera having a common fish eye lens with centered imager, with the resolution marked by percentages.
Figure 9B:
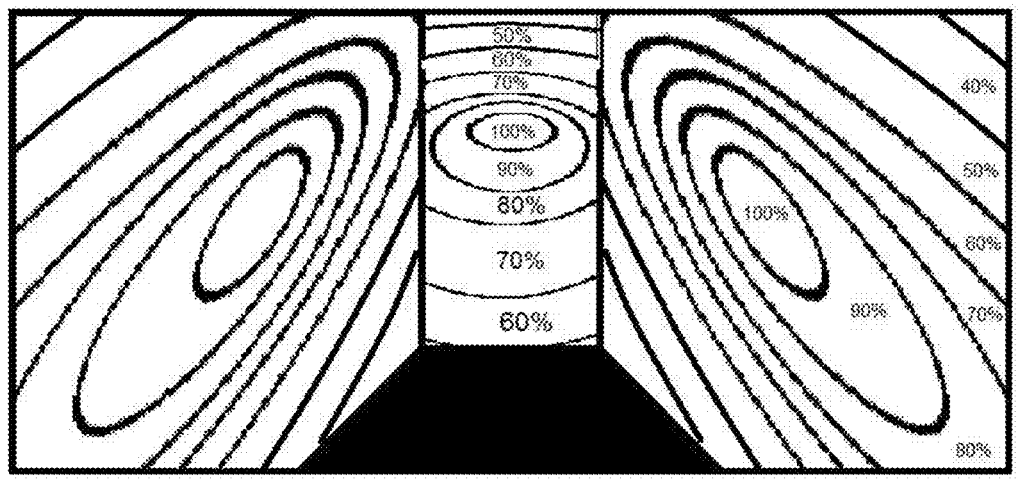
FIG. 9B is a schematic showing resolution of a rear camera of the present invention, having a high distortion lens shifted along the imager's short side in combination with the imager long side lens shifted side cameras.

Both the solution suggested in U.S. Publication No. US-2010-0020170 using common fisheye rear cameras with centered imagers (see displayed image from such cameras in FIG. 7) for the two side cameras and the rear camera as well as solutions having side cameras in accordance with International Publication No. WO 2014/204794, but having common fisheye rear cameras with centered imagers (FIG. 8) suffer under low resolution in the horizontal view area. In the diagrams of FIGS. 9A and 9B, the center rear camera is in the box in the middle. In FIG. 9A, the rear camera has a common fish eye lens with centered imager. The declining resolution towards higher angles is emphasized.

Figure 11A:
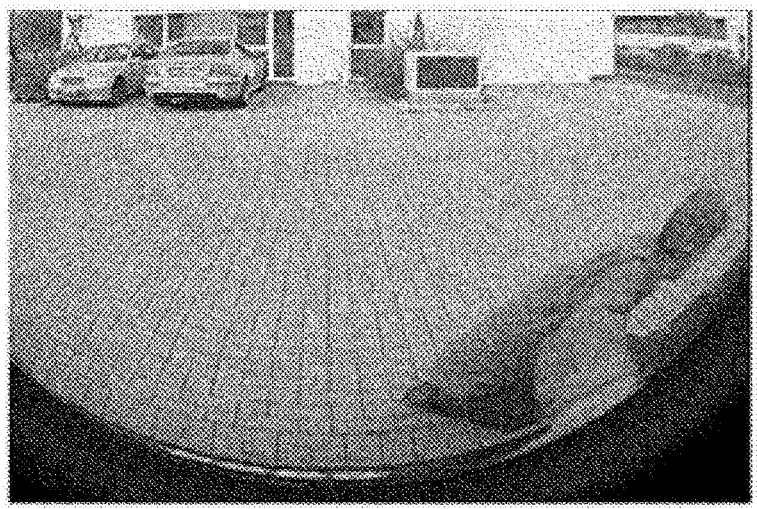
FIG. 11A is an image taken by a camera with a height distortion lens to imager assembled off center of the (rectangle) imager along the short side of the imager, such as shown in FIG. 10, in accordance with the present invention.
Figure 11B:
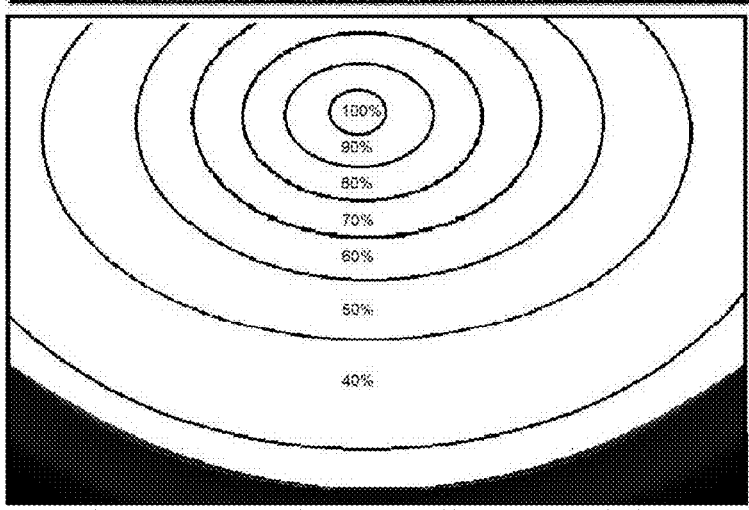
FIG. 11B is a schematic showing the percentage of the camera's resolution.
Figure 11C:
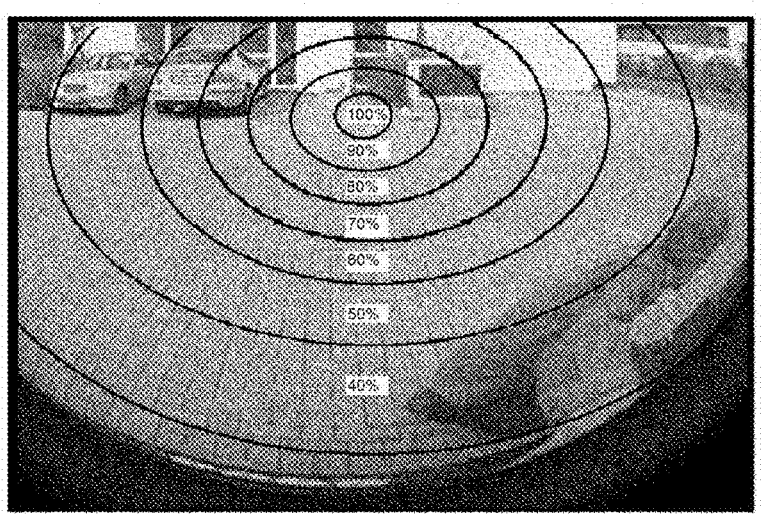
FIG. 11C shows the image of FIG. 11A overlayed with the schematic of FIG. 11B.
Figure 12A:
FIG. 12A is a panorama rear view using a rear camera in accordance with the present invention having a high distortion lens shifted along the imager's short side, showing an image captured by such a rear camera stitched with images from side cameras directed to the rear with imager long side lens shifted.
Figure 12B:
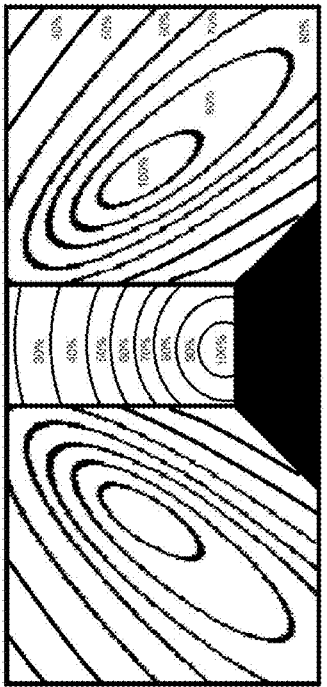
FIG. 12B is a schematic showing the resolution of each camera source of FIG. 12A, with the middle rear camera image being a cropping of the image of FIG. 11B.
Figure 12C:
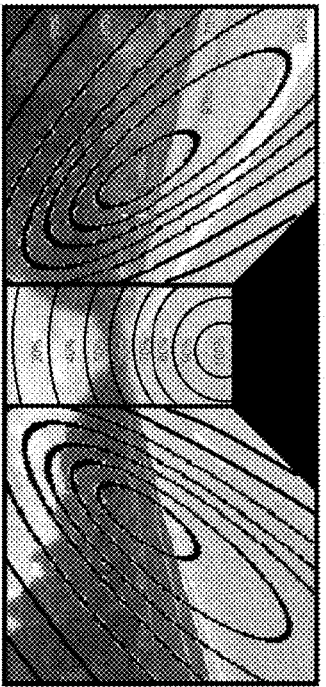
FIG. 12C shows the image of FIG. 12A overlayed with the schematic of FIG. 12B.
Figure 12D:
FIG. 12D is a panorama rear view using a conventional rear camera with an image captured by such an imager centered lens system stitched with images from side cameras directed to the rear with imager long side lens shifted.
Figure 12E:
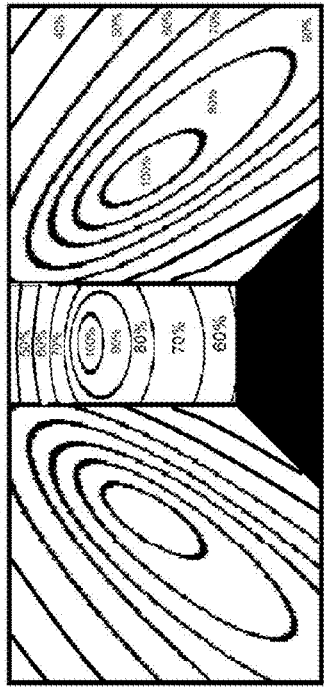
FIG. 12E is a schematic showing the resolution of each camera source of FIG. 12D.
Figure 12F:
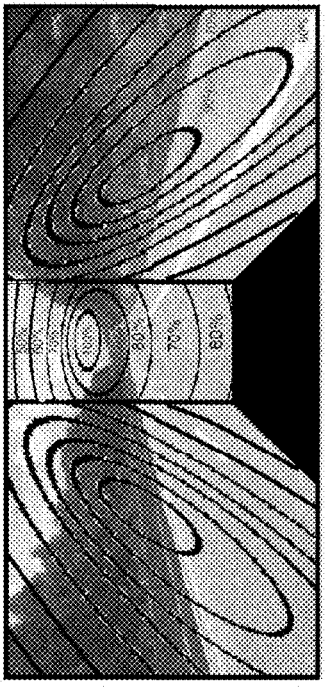
FIG. 12F shows the image of FIG. 12D overlayed with the schematic of FIG. 12E.

The present invention provides a vision system that uses a center camera having a fish eye lens or high distortion lens, preferably a high distortion fish eye lens, which is assembled off center of the (rectangular) imager along the short side of the imager, such as shown in FIG. 10. In the example of FIG. 10, the imager is shifted at about ⅓ of the imager's height along the short side (the vertical dimension of the imager). For example, a Sunex DSL 213 lens may be used with an Omnivision OV 10630 imager with the offset of the present invention. When using such a camera-lens configuration, the image in the center which may be directed to the rear horizon region at the rear of the vehicle may still be pleasing also in distance and may still show the left and right rear far edges area of the vehicle for safe maneuvering such as when parking and for generating a cross traffic view (see FIG. 11A). When attached in combination with side cameras (such as according to International Publication No. WO 2014/204794, incorporated above), an acceptable panorama view may be producible when stitching the side and the rear view images into a single merged or combined image (see FIG. 12A). FIG. 11B shows a diagram of the resolution distribution of a lens-imager shifted system in accordance with the present invention (shown in the example of FIG. 10). In FIG. 11C, the diagram of resolution is overlayed to the real image of FIG. 11A. The center or region of highest resolution is to be found at about the horizon. FIG. 9B shows the diagram of using such a rear camera of the present invention in combination with the imager long side lens shifted side cameras in accordance with International Publication No. WO 2014/204794. Compared to FIG. 9A, the resolution's maximum of each camera is at about the same height (and thus, the displayed image derived from captured and stitched image data from the three cameras provides a more uniform appearance and enhanced clarity along the horizon region). For comparison, the real images of a panorama rear view according the present invention in FIG. 12A is set beside a panorama rear view using a conventional imager centered lens rear camera in FIG. 12D, with the diagrams shown in FIGS. 12B and 12E and the rear image overlayed diagrams shown in FIGS. 12C and 12F (FIG. 9A is a smaller scaled version of FIG. 12B, and FIG. 9B is a smaller scaled version of FIG. 12E). As can be seen with reference to FIGS. 12A and 12D, the displayed image of FIG. 12A has a sharper focus and enhanced resolution at the center region, thus providing an enhanced displayed image having sharper clarity or resolution along the horizon region rearward of the vehicle.

Figure 13:
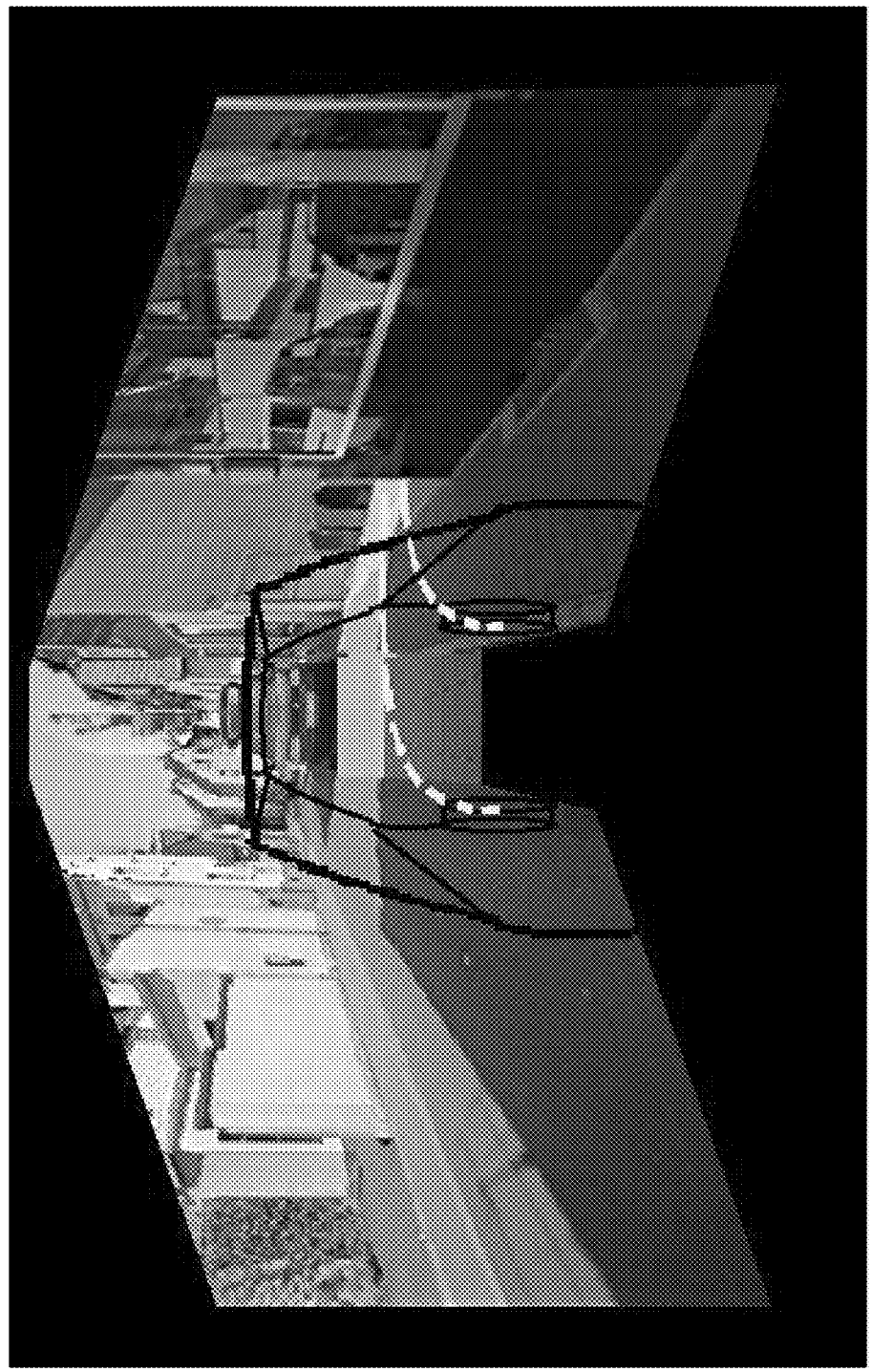
FIG. 13 is a displayed image having graphic overlays established thereon.

As another aspect of the invention, when producing a panorama view, there may be a rear turn mode. Optionally, and additionally or alternatively, this mode may be engaged when the rear or reverse gear is engaged. In that mode, an edge cage overlay of the outer vehicle contour may be overlayed on top of the rear panorama image. The cage overlay (such as a wireframe or outline of the vehicle as shown in FIG. 13) of the system of the present invention is for plausibilization of the equipped vehicle's extension relative to the vehicle's surrounding scene, such as may be provided by filled or partially or locally transparent overlays of known top view systems. The panels of the cage may not be filled or may be mostly transparent, in order to avoid hiding the image of the vehicle's rear. As an additional or alternative option, the driving path of the rear wheels in relation to the turning wheel angle may be overlayed (see FIG. 13). Similar to known rear camera rear vision systems, the curvature may be adapted dynamically when turning the steering wheel.

Departing from typical rear camera vision systems, the virtual view point is at the heights of the front seats looking rearwardly. Different to surround view vision systems, the side cameras are rearwardly directed and optionally have no fish eye lens systems with centered imagers but shifted lenses such as described in International Publication No. WO 2014/204794. The outside scene, rearwardly and sidewardly is captured much sharper and no skewing of objects with z-elevation occurs. That disturbing effect is known from surround view vision systems. Optionally, the rear wheel's rolling may be animated by an animated overlay (since the wheel's tire is typically not captured by any camera). It is known from single rear camera and top view or surround view systems to highlight collision hazards by colored overlays. It is also known to change the overlays color, such as, for example, from green over yellow to red with diminishing distance to a collision hazard object, and it may be static or (itself) moving. The system of the present invention may change the color of the cage edges overlayed into the panorama view according to the distance of a collision hazard object. The surrounding vertical objects may be detected by a non-image-based or non-camera sensor, such as a Radar, Ultrasound, TOF (time of flight) or Lidar sensor system or the like.

It is cost wise advantageous to have no additional sensors or devices (flash or LASER), but to just use the vision camera images to determine the distance to hazardous objects. A proper vision only method is to determine the distance of objects by analyzing the motion flow (structure from motion) such as according to International Publication No. WO 2012/145819, which is hereby incorporated herein by reference in its entirety. Alternatively, stereo vision may be used (such as by using aspects of the systems described in U.S. Pat. No. 6,396,397, which is hereby incorporated herein by reference in its entirety). Some of the camera vision fields may overlap. In these areas, stereo image computation is possible to determine a 3D scene understanding. Additionally or alternatively, size comparing methods for mono camera systems may come into use to accomplish this, such as by using aspects of U.S. Publication No. US-2013-0222592, which is hereby incorporated herein by reference in its entirety. As described in U.S. Publication No. US-2013-0222592, unknown total heights of a vehicle with luggage on top or the unknown total heights of a trailer within the camera's view are estimated by comparing the unknown heights in relation to elements of known heights in the camera's field of view. These also work when the vehicle and surrounding objects are not in motion.

In International Publication No. WO 2013/109869 (which is hereby incorporated herein by reference in its entirety), a vehicle vision system with free positional virtual panoramic view is described. International Publication No. WO 2013/109869 suggested to use imposters for view generation. Furthermore it was suggested to use a head/eye tracking system for generating a 3D parallax effect (also known as pseudo 3D or motion parallax scrolling) for the according viewer.

Figure 14:
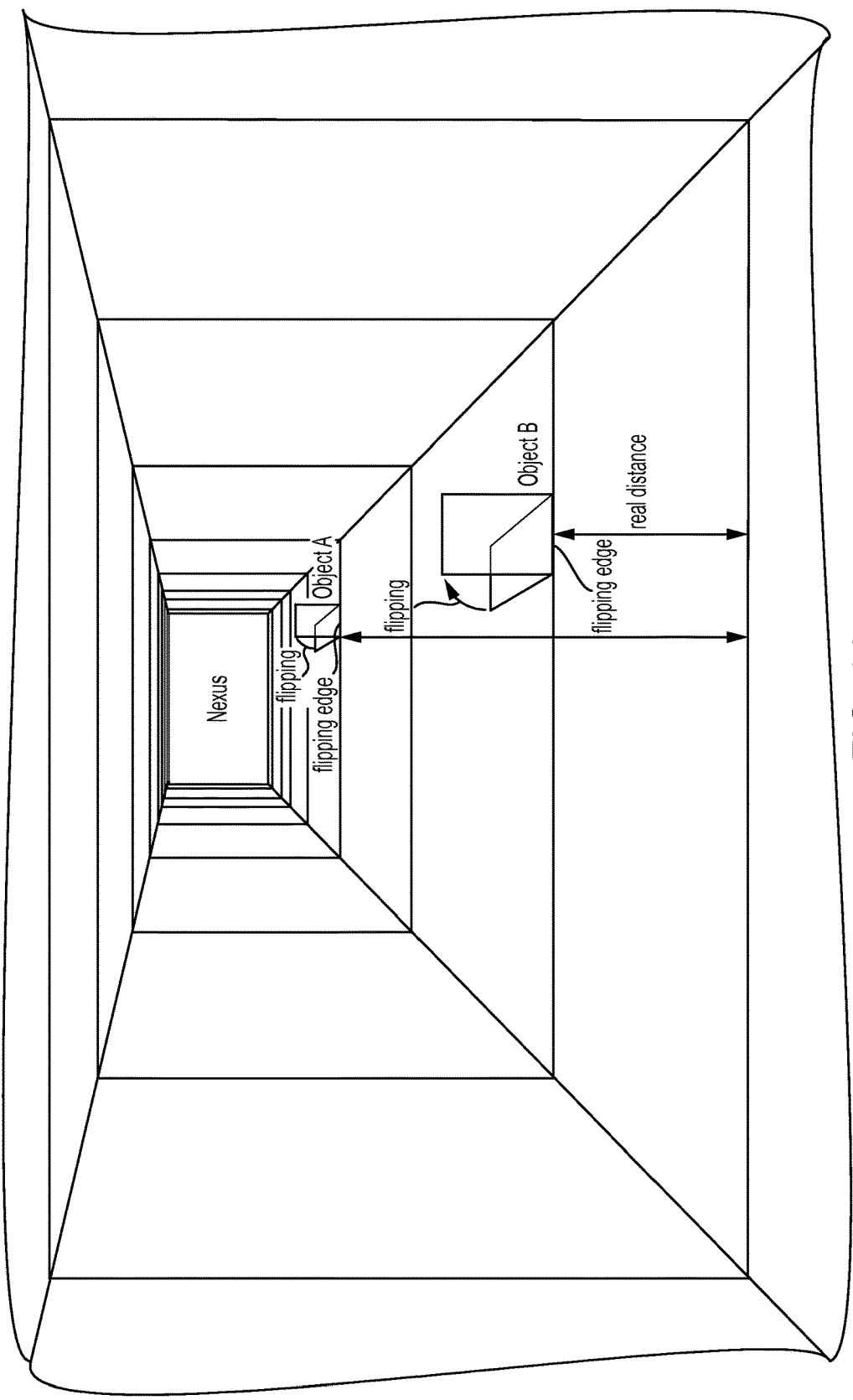
FIG. 14 is an image showing two objects at two different distances as imposters in a panoramic view.
Figure 15:
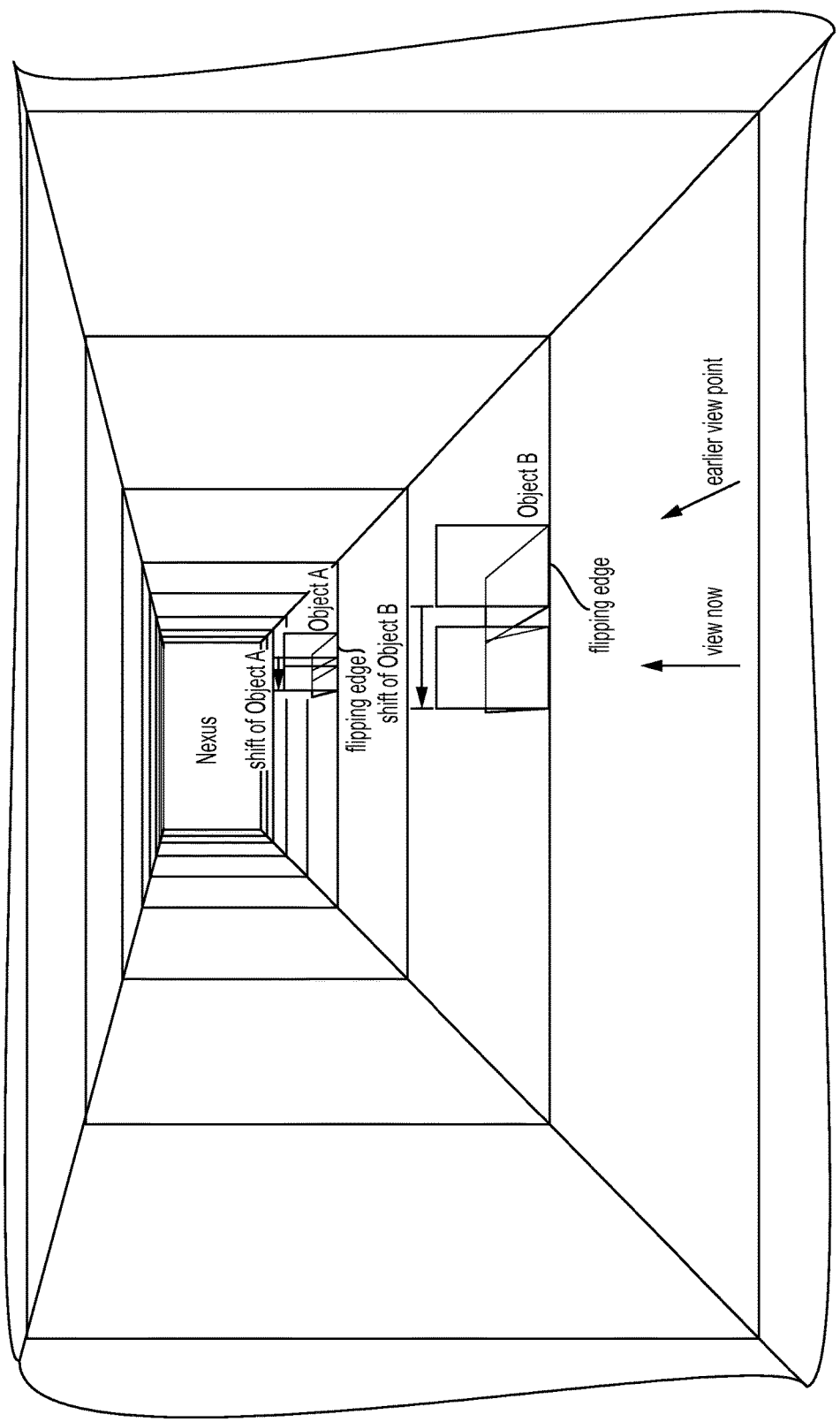
FIG. 15 is an image showing how the imposters in the image of FIG. 14 may shift according to a viewpoint change of a viewer whose head/eyes is/are being tracked.

The present invention provides a fish eye lens or high distortion lens that is assembled off center of the (rectangle) imager along the short side of the imager, such as shown in FIG. 10. When using images (such as seen in FIG. 11A) from the rear camera with a configuration as suggested in FIG. 10, a rearwardly facing panorama view may have such improved quality that generated imposters of objects (with distance optionally detected by the methods described above) have enough resolution to please a viewer. The virtual view object distances may correspond substantially or exactly or may be ordered in quantized distance steps (coulisse layers). Optionally, an in cabin head/eye tracker may be used additionally (such as in accordance with International Publication No. WO 2013/109869) for providing a (real time) 3D motion parallax scrolling. The example of FIG. 14 shows two objects in two different distances as imposters in a panoramic view. FIG. 15 shows how the imposters may shift according to a viewpoint change of a viewer who has his or her head/eyes being tracked (such as by an interior monitoring system or the like). In the example of FIG. 15, the 'earlier view point' may be the view as shown in FIG. 14, the 'view now' may be the view after the shift of the viewer's position was done. The use of imposters is beneficial compared to the computation effort that a scene using a 3D rendering would require. This method is especially interesting to use for generating a panorama view when objects are in relatively short distance to the vehicle's rear, such as in a range of about 0 m to about 40 m. Optionally, the vision system of the present invention may switch or smoothly alter the view generation depending on the distance of the closest (detected) objects rearward of the vehicle. The system may use the input of several cameras, preferably the two (at least partially) rearward viewing side cameras. For displaying the panorama vision, the system may optionally have a wide screen head up display system, optionally with 3D capability, and optionally with the ability to compensate eye defects such as presbyopia, such as by utilizing aspects of the systems described in U.S. provisional application Ser. No. 62/173,435, filed Jun. 10, 2015, which is hereby incorporated herein by reference in its entirety.

Thus, the present invention provides a vision system with a rearward facing camera (at a rear portion of a vehicle) having an imager with its wide angle or fisheye lens offset relative to the center of the camera and offset along the shorter side dimension of the imager. The rear camera captures images of the scene rearward of the vehicle and the captured images include the left and rear portions of the rear of the vehicle. Thus, when the rear image is combined or merged or stitched with images captured by the side mounted cameras (having fields of view sideward and rearward of the vehicle), the displayed stitched image provides an enhanced image for viewing by the driver of the vehicle, such as during a reversing maneuver of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European Patent Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
a plurality of cameras configured to be disposed at a vehicle equipped with said vision system so as to have respective fields of view exterior of the equipped vehicle;
wherein said cameras capture image data;
wherein said cameras include a rear camera configured to be disposed at a rear portion of the equipped vehicle so as to have a rearward field of view;
wherein said rear camera comprises a rear imager and a rear wide angle lens;
wherein said rear imager comprises a two dimensional imaging array sensor having a plurality of photosensing elements arranged in rows and columns;
wherein said imaging array sensor of said rear imager has a center region;
wherein said rear wide angle lens has a center axis;
wherein said rear wide angle lens is disposed at said rear imager with said center axis of said rear wide angle lens vertically offset upward from said center region of said imaging array sensor of said rear imager, and wherein a center region of said rear wide angle lens is disposed at and images at an upper region of said imaging array sensor of said rear imager when said rear camera is disposed at the rear of the equipped vehicle, and wherein a lower peripheral region of said rear wide angle lens is disposed at and images at said center region and a lower region of said imaging array sensor of said rear imager when said rear camera is disposed at the rear of the equipped vehicle;
wherein image data captured by said imaging array sensor of said rear imager that is associated with light imaged at said upper region of said imaging array sensor of said rear imager that has passed through said center region of said rear wide angle lens has less distortion than image data captured by said imaging array sensor of said rear imager that is associated with light imaged at said center and lower regions of said imaging array sensor of said rear imager that has passed through said lower peripheral region of said rear wide angle lens;
wherein the field of view of said rear camera, when said rear camera is disposed at the rear portion of the equipped vehicle, includes at least one rear portion of the equipped vehicle;
wherein the field of view of said rear camera, when said rear camera is disposed at the rear portion of the equipped vehicle, includes an external scene having (i) a distant central horizon region rearward of the equipped vehicle and (ii) a closer region that is closer to the equipped vehicle and rearward of and adjacent to the equipped vehicle, and wherein the distant central horizon region is imaged at said upper region of said imaging array sensor of said rear imager via light that has passed through said center region of said rear wide angle lens, and wherein the closer region is imaged at said center region and said lower region of said imaging array sensor of said rear imager via light that has passed through said lower peripheral region of said rear wide angle lens;
wherein said cameras include side cameras configured to be disposed at respective side portions of the equipped vehicle so as to have respective sideward and rearward fields of view;
an image processor operable to process image data captured by at least some of said cameras;
wherein said image processor is operable to manipulate image data captured by at least some of said cameras to provide a panoramic image for display on a video display for viewing by the driver of the equipped vehicle during a reversing maneuver of the equipped vehicle; and
wherein, as displayed on said video display for viewing by the driver of the equipped vehicle during the reversing maneuver of the equipped vehicle, the displayed panoramic image of the imaged external scene has less distortion and has enhanced image resolution at the imaged and displayed distant central horizon region rearward of the equipped vehicle as compared to the distortion and image resolution at the imaged and displayed closer region rearward of and adjacent to the equipped vehicle.

2. The vision system of claim 1, wherein each of said side cameras comprises a side lens and a side imager comprising a two dimensional imaging array sensor having a plurality of photosensing elements arranged in rows and columns, and wherein said side imager has a center region and said side lens has a center axis, and wherein said side lens is disposed at said side imager with said center axis of said side lens laterally offset from said center region of said side imager when said side camera is disposed at the equipped vehicle.

3. The vision system of claim 2, wherein a first side camera of said side cameras is configured to be disposed at a driver-side of the equipped vehicle, and wherein, with said first side camera disposed at the driver-side of the equipped vehicle, said side lens of said first side camera is laterally offset relative to said side imager of said first side camera laterally inboard towards the driver-side of the equipped vehicle so that a center region of said side lens of said first side camera images at a laterally inboard region of said imaging array sensor of said first side camera, and wherein a second side camera of said side cameras is configured to be disposed at a passenger-side of the equipped vehicle, and wherein, with said second side camera disposed at the passenger-side of the equipped vehicle, said side lens of said second side camera is laterally offset relative to said side imager of said second side camera laterally inboard towards the passenger-side of the equipped vehicle so that a center region of said side lens of said second side camera images at a laterally inboard region of said imaging array sensor of said second side camera.

4. The vision system of claim 3, wherein, as displayed on said video display for viewing by the driver of the equipped vehicle, the displayed panoramic image has reduced distortion and has enhanced image resolution at an imaged and displayed distant side horizon region rearward and sideward of the equipped vehicle imaged at the laterally inboard regions of said imaging array sensors of said first and second side cameras as compared to (i) the distortion and image resolution at imaged and displayed closer side regions of the external scene rearward and sideward of and adjacent to the equipped vehicle and (ii) the distortion and image resolution at imaged and displayed laterally outboard regions of the external scene laterally outboard of the sides of the equipped vehicle.

5. The vision system of claim 1, wherein a graphic overlay is established on the displayed panoramic images.

6. The vision system of claim 5, wherein said graphic overlay comprises a wireframe outline of the equipped vehicle.

7. The vision system of claim 6, wherein portions of the wireframe outline may be colored to represent panels of the equipped vehicle.

8. The vision system of claim 5, wherein said graphic overlay comprises indicia representative of a driving path of the equipped vehicle during the reversing maneuver.

9. The vision system of claim 8, wherein said indicia is adjusted responsive to a steering wheel angle of the equipped vehicle.

10. The vision system of claim 1, wherein said image processor processes captured image data to determine the presence of objects rearward of the equipped vehicle.

11. The vision system of claim 10, wherein said image processor is operable to adjust processing of captured image data to adjust a position of objects in displayed panoramic images to account for a change in position or viewpoint of the driver of the equipped vehicle.

12. The vision system of claim 11, wherein said image processor adjusts processing responsive to a driver monitoring system that monitors a head or eyes of the driver of the equipped vehicle.

13. The vision system of claim 11, wherein said image processor adjusts processing responsive to a distance of the closest determined object rearward of the equipped vehicle.

14. A vision system for a vehicle, said vision system comprising:
- a plurality of cameras configured to be disposed at a vehicle equipped with said vision system so as to have respective fields of view exterior of the equipped vehicle;
- wherein said cameras capture image data;
- wherein said cameras include a rear camera configured to be disposed at a rear portion of the equipped vehicle so as to have a rearward field of view;
- wherein said rear camera comprises a rear imager and a rear wide angle lens;
- wherein said rear imager comprises a two dimensional imaging array sensor having a plurality of photosensing elements arranged in rows and columns;
- wherein said imaging array sensor of said rear imager has a center region;
- wherein said rear wide angle lens has a center axis;
- wherein said rear wide angle lens is disposed at said rear imager with said center axis of said rear wide angle lens vertically offset upward from said center region of said imaging array sensor of said rear imager and wherein a center region of said rear wide angle lens is disposed at and images at an upper region of said imaging array sensor of said rear imager when said rear camera is disposed at the rear of the equipped vehicle, and wherein a lower peripheral region of said rear wide angle lens is disposed at and images at said center region and a lower region of said imaging array sensor of said rear imager when said rear camera is disposed at the rear of the equipped vehicle;
- wherein image data captured by said imaging array sensor of said rear imager that is associated with light imaged at said upper region of said imaging array sensor of said rear imager that has passed through said center region of said rear wide angle lens has less distortion than image data captured by said imaging array sensor of said rear imager that is associated with light imaged at said center and lower regions of said imaging array sensor of said rear imager that has passed through said lower peripheral region of said rear wide angle lens;
- wherein the field of view of said rear camera, when said rear camera is disposed at the rear portion of the equipped vehicle, includes at least one rear portion of the equipped vehicle;
- wherein the field of view of said rear camera, when said rear camera is disposed at the rear portion of the equipped vehicle, includes a rear external scene having (i) a distant central horizon region rearward of the equipped vehicle and (ii) a closer region that is closer to the equipped vehicle and rearward of and adjacent to the equipped vehicle, and wherein the distant central horizon region is imaged at said upper region of said imaging array sensor of said rear imager via light that has passed through said center region of said rear wide angle lens, and wherein the closer region is imaged at said center region and said lower region of said imaging array sensor of said rear imager via light that has passed through said lower peripheral region of said rear wide angle lens, and wherein the at least one rear portion of the equipped vehicle is within the closer region;
- wherein said cameras include first and second side cameras configured to be disposed at respective side portions of the equipped vehicle so as to have respective sideward and rearward fields of view;
- wherein said first side camera comprises a first side lens and a first side imager comprising a two dimensional imaging array sensor having a plurality of photosensing elements arranged in rows and columns, and wherein said first side imager has a center region and first said side lens has a center axis, and wherein said first side lens is disposed at said first side imager with said center axis of said first side lens laterally offset from said center region of said first side imager when said first side camera is disposed at the equipped vehicle;
- wherein said second side camera comprises a second side lens and a second side imager comprising a two dimensional imaging array sensor having a plurality of photosensing elements arranged in rows and columns, and wherein said second side imager has a center region and said second side lens has a center axis, and wherein said second side lens is disposed at said second side imager with said center axis of said second side lens laterally offset from said center region of said second side imager when said second side camera is disposed at the equipped vehicle;
- wherein said first side camera is configured to be disposed at a driver-side of the equipped vehicle and wherein, with said first side camera disposed at the driver-side of the equipped vehicle, said first side lens of said first side camera is laterally offset relative to said first side imager laterally inboard towards the driver-side of the equipped vehicle so that a center region of said first side lens images at a laterally inboard region of said imaging array sensor of said first side camera;
- wherein said second side camera is configured to be disposed at a passenger-side of the equipped vehicle and wherein, with said first side camera disposed at the driver-side of the equipped vehicle, said second side lens of said second side camera is laterally offset relative to said second side imager laterally inboard towards the passenger-side of the equipped vehicle so that a center region of said second side lens images at a laterally inboard region of said imaging array sensor of said second side camera;

wherein the field of view of said first side camera, when said first side camera is disposed at the driver-side of the equipped vehicle, includes a first side external scene having (i) a distant driver-side horizon region rearward of the equipped vehicle, (ii) a closer driver-side region rearward of and sideward of and adjacent to the driver-side of the equipped vehicle, and (iii) a laterally outboard driver-side region that is laterally outboard and sideward of the driver-side of the equipped vehicle;

wherein the distant driver-side horizon region of the first side external scene is imaged at said laterally inboard region of said imaging array sensor of said first side imager via light that has passed through said center region of said first side lens, and wherein the closer driver-side region of the first side external scene is imaged at a lower region of said imaging array sensor of said first side imager via light that has passed through a lower region of said first side lens that is below said center region of said first side lens, and wherein the laterally outboard driver-side region of the first side external scene is imaged at a laterally outboard region of said imaging array sensor of said first side imager via light that has passed through a laterally outboard region of said first side lens that is laterally outboard of said center region of said first side lens;

wherein the field of view of said second side camera, when said second side camera is disposed at the passenger-side of the equipped vehicle, includes a second side external scene having (i) a distant passenger-side horizon region rearward of the equipped vehicle, (ii) a closer passenger-side region rearward of and sideward of and adjacent to the passenger-side of the equipped vehicle, and (iii) a laterally outboard passenger-side region that is laterally outboard and sideward of the passenger-side of the equipped vehicle;

wherein the distant passenger-side horizon region of the second side external scene is imaged at said laterally inboard region of said imaging array sensor of said second side imager via light that has passed through said center region of said second side lens, and wherein the closer passenger-side region of the second side external scene is imaged at a lower region of said imaging array sensor of said second side imager via light that has passed through a lower region of said second side lens that is below said center region of said second side lens, and wherein the laterally outboard passenger-side region of the second side external scene is imaged at a laterally outboard region of said imaging array sensor of said second side imager via light that has passed through a laterally outboard region of said second side lens that is laterally outboard of said center region of said second side lens;

an image processor operable to process image data captured by at least some of said cameras;

wherein said image processor is operable to manipulate image data captured by at least said rear camera, said first side camera and said second side camera to provide a panoramic image for display on a video display for viewing by the driver of the equipped vehicle during a reversing maneuver of the equipped vehicle;

wherein, as displayed on said video display for viewing by the driver of the equipped vehicle during the reversing maneuver of the equipped vehicle, the displayed rear external scene of the panoramic image has less distortion and has enhanced image resolution at the imaged and displayed distant central horizon region rearward of the equipped vehicle as compared to the distortion and image resolution of the imaged and displayed at least one rear portion of the equipped vehicle;

wherein, as displayed on said video display for viewing by the driver of the equipped vehicle during the reversing maneuver of the equipped vehicle, the displayed first side external scene of the panoramic image has less distortion and has enhanced image resolution at the imaged and displayed distant driver-side horizon region rearward and sideward of the equipped vehicle as compared to the distortion and image resolution at (i) the imaged and displayed closer driver-side region rearward and sideward of and adjacent to the driver-side of the equipped vehicle and (ii) the imaged and displayed laterally outboard driver-side region; and wherein, as displayed on said video display for viewing by the driver of the equipped vehicle during the reversing maneuver of the equipped vehicle, the displayed second side external scene of the panoramic image has less distortion and has enhanced image resolution at the imaged and displayed distant passenger-side horizon region rearward and sideward of the equipped vehicle as compared to the distortion and image resolution at (i) the imaged and displayed closer passenger-side region rearward and sideward of and adjacent to the driver-side of the equipped vehicle and (ii) the imaged and displayed laterally outboard passenger-side region.

15. The vision system of claim 14, wherein a graphic overlay is established on the displayed panoramic images, and wherein said graphic overlay comprises a wireframe outline of the equipped vehicle.

16. The vision system of claim 15, wherein portions of the wireframe outline may be colored to represent panels of the equipped vehicle.

17. The vision system of claim 14, wherein said image processor processes captured image data to determine the presence of objects rearward of the equipped vehicle, and wherein said image processor is operable to adjust processing of captured image data to adjust a position of objects in displayed panoramic images to account for a change in position or viewpoint of the driver of the equipped vehicle.

18. A vision system for a vehicle, said vision system comprising:
a plurality of cameras configured to be disposed at a vehicle equipped with said vision system so as to have respective fields of view exterior of the equipped vehicle;
wherein said cameras capture image data;
wherein said cameras include a rear camera configured to be disposed at a rear portion of the equipped vehicle so as to have a rearward field of view;
wherein said rear camera comprises a rear imager and a rear wide angle lens;
wherein said rear imager comprises a two dimensional imaging array sensor having a plurality of photosensing elements arranged in rows and columns;
wherein said imaging array sensor of said rear imager has a center region;

wherein said rear wide angle lens has a center axis;

wherein said rear wide angle lens is disposed at said rear imager with said center axis of said rear wide angle lens vertically offset upward from said center region of said imaging array sensor of said rear imager, and wherein a center region of said rear wide angle lens is disposed at and images at an upper region of said imaging array sensor of said rear imager when said rear camera is disposed at the rear of the equipped vehicle, and wherein a lower peripheral region of said rear wide angle lens is disposed at and images at said center region and a lower region of said imaging array sensor of said rear imager when said rear camera is disposed at the rear of the equipped vehicle;

wherein image data captured by said imaging array sensor of said rear imager that is associated with light imaged at said upper region of said imaging array sensor of said rear imager that has passed through said center region of said rear wide angle lens has less distortion than image data captured by said imaging array sensor of said rear imager that is associated with light imaged at said center and lower regions of said imaging array sensor of said rear imager that has passed through said lower peripheral region of said rear wide angle lens;

wherein the field of view of said rear camera, when said rear camera is disposed at the rear portion of the equipped vehicle, includes at least one rear portion of the equipped vehicle;

wherein the field of view of said rear camera, when said rear camera is disposed at the rear portion of the equipped vehicle, includes an external scene having (i) a distant central horizon region rearward of the equipped vehicle and (ii) a closer region that is closer to the equipped vehicle and rearward of and adjacent to the equipped vehicle and that includes the at least one rear portion of the equipped vehicle, and wherein the distant central horizon region is imaged at said upper region of said imaging array sensor of said rear imager via light that has passed through said center region of said rear wide angle lens, and wherein the closer region is imaged at said center region and said lower region of said imaging array sensor of said rear imager via light that has passed through said lower peripheral region of said rear wide angle lens;

wherein said cameras include side cameras configured to be disposed at respective side portions of the equipped vehicle so as to have respective sideward and rearward fields of view;

wherein each of said side cameras comprises a side lens and a side imager comprising a two dimensional imaging array sensor having a plurality of photosensing elements arranged in rows and columns, and wherein each of said side imagers has a center region and wherein each of said side lenses has a center axis, and wherein said side lens is disposed at said side imager with said center axis of said side lens laterally offset from said center region of said side imager;

wherein, with said side cameras disposed at the respective sides of the equipped vehicle, said side lens of the respective side camera is laterally offset relative to said side imager laterally inboard towards the respective side of the equipped vehicle so that a center region of said side lens images at a laterally inboard region of said imaging array sensor of the respective side camera;

wherein the field of view of each of said side cameras, when said side cameras are disposed at the equipped vehicle, includes a respective side external scene having (i) a respective distant side horizon region rearward of the equipped vehicle, (ii) a respective closer side region rearward of and sideward of and adjacent to the respective side of the equipped vehicle, and (iii) a respective laterally outboard side region that is laterally outboard and sideward of the respective side of the equipped vehicle;

wherein the respective distant side horizon region of the respective side external scene is imaged at said laterally inboard region of said imaging array sensor of the respective side imager via light that has passed through said center region of said side lens, and wherein the respective closer side region of the respective side external scene is imaged at a lower region of said imaging array sensor of the respective side camera via light that has passed through a lower region of said side lens that is below said center region of said side lens, and wherein the respective laterally outboard side region of the respective side external scene is imaged at a laterally outboard region of said imaging array sensor of said side imager via light that has passed through a laterally outboard region of said side lens that is laterally outboard of said center region of said side lens;

an image processor operable to process image data captured by at least some of said cameras;

wherein said image processor is operable to manipulate image data captured by at least some of said cameras to provide a panoramic image for display on a video display for viewing by the driver of the equipped vehicle during a reversing maneuver of the equipped vehicle;

wherein, as displayed on said video display for viewing by the driver of the equipped vehicle during the reversing maneuver of the equipped vehicle, the displayed panoramic image of the external scene has less distortion and has enhanced image resolution at the imaged and displayed distant central horizon region rearward of the equipped vehicle as compared to the distortion and image resolution of the imaged and displayed at least one rear portion of the equipped vehicle;

wherein, as displayed on said video display for viewing by the driver of the equipped vehicle during the reversing maneuver of the equipped vehicle, the displayed side external scenes of the panoramic image each have less distortion and have enhanced image resolution at the imaged and displayed respective distant side horizon region rearward and sideward of the equipped vehicle as compared to the distortion and image resolution at (i) the imaged and displayed respective closer side region rearward and sideward of and adjacent to the respective side of the equipped vehicle and (ii) the imaged and displayed respective laterally outboard side region;

wherein a graphic overlay is established on the displayed panoramic images and wherein said graphic overlay comprises a wireframe outline of the equipped vehicle; and wherein said image processor processes captured image data to determine the presence of objects rearward of the equipped vehicle, and wherein said image processor is operable to adjust processing of captured image data to adjust a position of objects in displayed panoramic images to account for a change in position or viewpoint of the driver of the equipped vehicle.

19. The vision system of claim 18, wherein portions of the wireframe outline may be colored to represent panels of the equipped vehicle, and wherein said graphic overlay comprises indicia representative of a driving path of the equipped vehicle during the reversing maneuver, and wherein said indicia is adjusted responsive to a steering wheel angle of the equipped vehicle.

20. The vision system of claim 18, wherein said image processor adjusts processing responsive to at least one of the group consisting of (a) a driver monitoring system that monitors a head or eyes of the driver of the equipped vehicle and (b) a distance of the closest determined object rearward of the equipped vehicle.

* * * * *